United States Patent [19]
Kwon et al.

[11] Patent Number: 6,147,944
[45] Date of Patent: Nov. 14, 2000

[54] ECCENTRICITY SUPPRESSING SERVO METHOD AND APPARATUS

[75] Inventors: Dae Ik Kwon, Kyungki-do; Byung Hoon Min, Seoul, both of Rep. of Korea

[73] Assignee: LG Electronics, Inc., Seoul, Rep. of Korea

[21] Appl. No.: 09/138,565

[22] Filed: Aug. 24, 1998

[30] Foreign Application Priority Data

Aug. 25, 1997 [KR] Rep. of Korea ............. 97-40740

[51] Int. Cl.[7] ............................................. G11B 7/09
[52] U.S. Cl. ............................. 369/44.32; 369/44.29; 369/44.35
[58] Field of Search .................... 369/44.32, 44.28, 369/44.29, 44.35, 44.36, 44.13, 54, 50; 360/77.03, 77.04, 78.06, 77.08

[56] References Cited

U.S. PATENT DOCUMENTS

| | | | |
|---|---|---|---|
| 4,745,587 | 5/1988 | Maeda et al. | 369/44.28 |
| 4,748,609 | 5/1988 | Yonezawa et al. | 369/44.36 |
| 4,954,905 | 9/1990 | Wakabashi et al. | 360/77.03 |
| 5,023,857 | 6/1991 | Verboom | 369/44.32 |
| 5,065,263 | 11/1991 | Yoshida et al. | 360/77.03 |
| 5,402,400 | 3/1995 | Hamada et al. | 360/77.04 |
| 5,933,397 | 8/1999 | Yamashita et al. | 369/44.29 |

*Primary Examiner*—Thang V. Tran

[57] ABSTRACT

An eccentricity suppression control method for suppressing an affect caused by an eccentricity of an optical disc and responding to the eccentricity of the optical disc quickly. In the method, eccentricity amounts according to a phase of the optical disc is detected and estimating correction amounts for each phase suitable for suppressing each of the eccentricity amount according to the phase. The estimating correction amount for each phase is added to a tracking control signal responding to a tracking error, thereby performing a tracking control quickly and accurately.

10 Claims, 6 Drawing Sheets

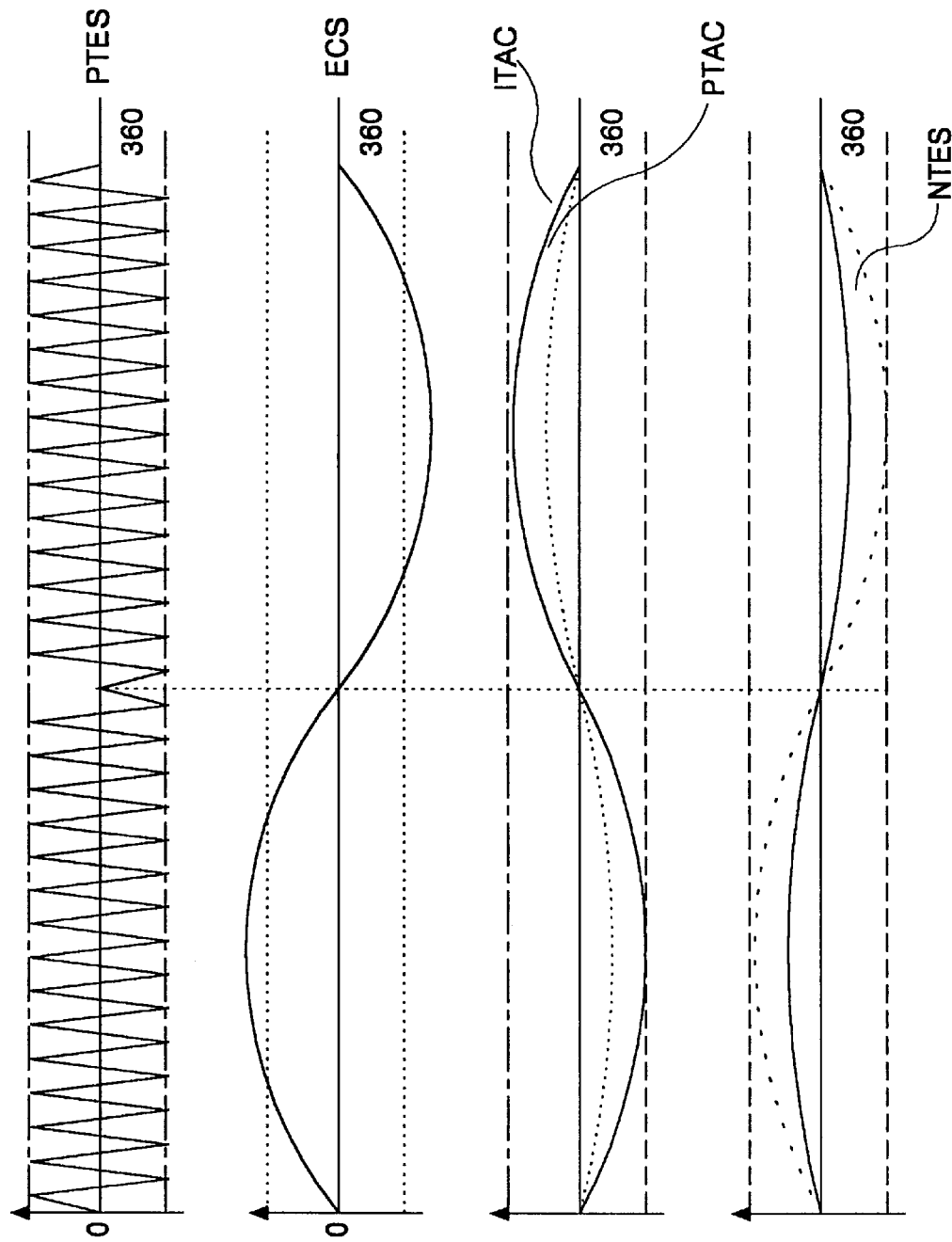

ECCENTRICITY SUPPRESSING SERVO METHOD AND APPARATUS

BACKGROUND OF THE INVENTION

1. Field of the Invention

This invention relates to a disc recording/reproducing apparatus, and more particularly to an eccentricity suppressing servo method and apparatus that is adapted to effectively suppress an eccentricity occurring when a disc is driven.

2. Description of the Prior Art

Nowadays, an optical recording medium has been prevalent as a recording medium for recording a high density information. The optical recording medium includes compact disc(CD) series discs and digital versatile disc(DVD) series discs having a recording density much higher than the CD series disc, etc. In such a disc type recording medium, an eccentricity occurs when the recording medium is driven. This is caused by an error generated at the manufacturing process of the disc and an error existing in a disc mechanism (i.e., a deck) included in the disc driver. Due to the eccentricity of disc, a laser light beam fails to be trace accurately along signal tracks on the optical disc. In other words, a tracking control can not be performed accurately at the disc driver. Due to this, the disc driver fails to record and reproduce the optical disc accurately.

In order to suppress the eccentricity of disc and perform the recording and reproduction of optical disc accurately, the optical disc recording/reproducing apparatus employs an eccentricity suppressing servo apparatus of feedback control system wherein a loop gain of the control system is increased within a range in which the control system is kept stabbly. As shown in FIG. 1, the eccentricity suppressing servo apparatus of feedback control system includes an adder 2 connected to make a single loop, a gain controller 4, and a planter 6. The adder 2 receives a feedback signal Y(t) from the planter 6. This feedback signal Y(t) includes an error component caused by an eccentricity of optical disc and error component caused by the outside interference as a tracking error signal. The adder 2 adds a reference signal Ref from an input line 1 to the feedback signal Y(t) to calculate a tracking correction amount. The gain controller 4 multiplies the tracking correction amount calculated with the adder 2 by a predetermined value to generate a tracking control signal having an increasing gain. In other words, the gain controller 4 responds to the tracking correction amount to increase a loop gain. Also, the gain controller 4 limits a gain of the tracking control signal in such a manner to exceed a certain value, thereby stabilizing the feedback control. The planter 6 responds to the tracking control signal from the gain controller 4 to move the position of a light beam in the width direction of signal track. Also, the planter 6 detects a degree at which a light beam departs from the center line of signal track, that is, a tracking error signal from the distribution of a light beam reflected by the optical disc, and applies the tracking error signal to the adder 2 as the feedback signal Y(t). In order to perform such a function, the planter 6 includes an optical pickup that has an actuator (not shown) for driving an objective lens and a photo detector(not shown) for detecting a reflective light from the optical disc, etc. In addition, the planter 6 includes a detection circuit for detecting the tracking error signal from a signal detected by means of the photo detector.

In The eccentricity suppressing servo apparatus of feedback control system as described above, an affect caused by the eccentricity of disc can be suppressed by increasing a loop gain depending upon the feedback tracking error signal, but a response speed becomes slow with respect to a disc eccentricity amount above a certain limit and the disc eccentricity amount above a certain limit can not be suppressed appropriately because a loop gain is limited within a certain limit, that is, within a range in which a control system is kept stabbly. Due to this, in a disc driver employing the feedback control system eccentricity suppressing servo apparatus as described above, a light beam fails to be trace along the signal track and, furthermore, it is difficult to perform a recording/reproducing operation of an optical disc accurately. An affect caused by such a disc eccentricity becomes more serious as a recording density of optical disc becomes higher, that is, as a distance between the signal tracks becomes shorter. Further, in a DVD-RAM including recording fields having land or groove signal tracks LS or GS and header fields having embossed pit trains, an affect stemming from the disc eccentricity becomes much more serious.

SUMMARY OF THE INVENTION

Accordingly, it is an object of the present invention to provide an eccentricity suppression control method and apparatus that is adapted to suppress an affect caused by an eccentricity of optical disc.

Further object of the present invention is to provide an eccentricity suppression control method and apparatus that is adapted to respond to an eccentricity of optical disc quickly.

Still further object of the present invention is to provide a disc driver that is adaptive to suppress an affect caused by an eccentricity of optical disc.

Still further object of the present invention is to provide a disc driver that is adapted to respond to an eccentricity of optical disc quickly.

Still further object of the present invention is to provide an optical disc recording/reproducing apparatus that is adapted to suppress an affect caused by an eccentricity of optical disc.

In order to achieve these and other objects of the invention, an eccentricity suppressing method according to one aspect of the present invention includes the steps of detecting eccentricity amounts according to a phase of an optical disc, providing estimating correction amounts for each phase suitable for suppressing each of the eccentricity amounts, and responding to a tracking error and the estimating correction amounts for each phase to control a tracking of light beam.

An eccentricity suppressing apparatus according to another aspect of the present invention includes eccentricity detecting means for detecting eccentricity amounts according to a phase of an optical disc, suppression amount calculating means for providing estimating correction amounts for each phase suitable for suppressing each of the eccentricity amounts, and tracking control means for responding to a tracking error and the estimating correction amounts for each phase to control a tracking of light beam.

An optical disc recording/reproducing servo method according to yet another aspect of the present invention includes detecting eccentricity amounts according to a phase of an optical disc, providing estimating correction amounts for each phase suitable for suppressing each of the eccentricity amounts, responding to a tracking error and the estimating correction amounts for each phase to control a tracking of light beam, and performing a recording and reproduction of an information for the optical disc.

An optical disc driver according to still another aspect of the present invention includes eccentricity detecting means for detecting eccentricity amounts according to a phase of an optical disc, suppression amount calculating means for providing estimating correction amounts for each phase suitable for suppressing each of the eccentricity amounts, tracking control means for responding to a tracking error and the estimating correction amounts for each phase to control a tracking of light beam, and recording/reproducing means for performing a recording and reproduction of an information for the optical disc.

BRIEF DESCRIPTION OF THE DRAWINGS

These and other objects of the invention will be apparent from the following detailed description of the embodiments of the present invention with reference to the accompanying drawings, in which:

FIG. 4 is waveform diagrams of signals generated at the eccentricity suppressing servo apparatus shown in FIG. 3;

DETAILED DESCRIPTION OF THE PREFERRED EMBODIMENT

Figure 1:
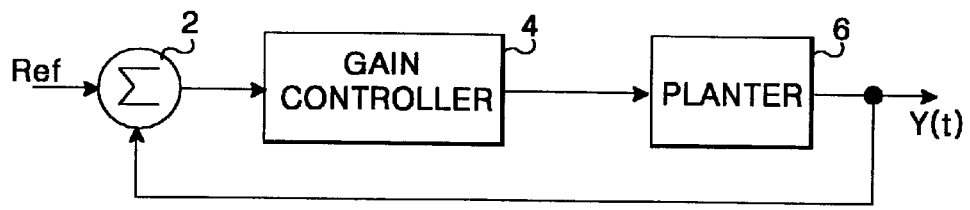
FIG. 1 is a schematic block diagram of a conventional eccentricity suppressing servo apparatus.
Figure 3:
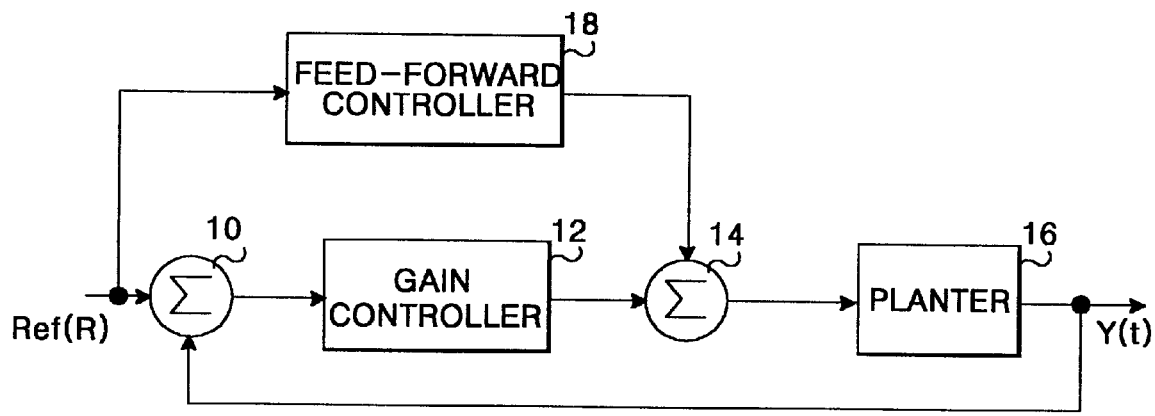
FIG. 3 is a schematic block diagram of an eccentricity suppressing servo apparatus according to an embodiment of the present invention.
Figure 2:
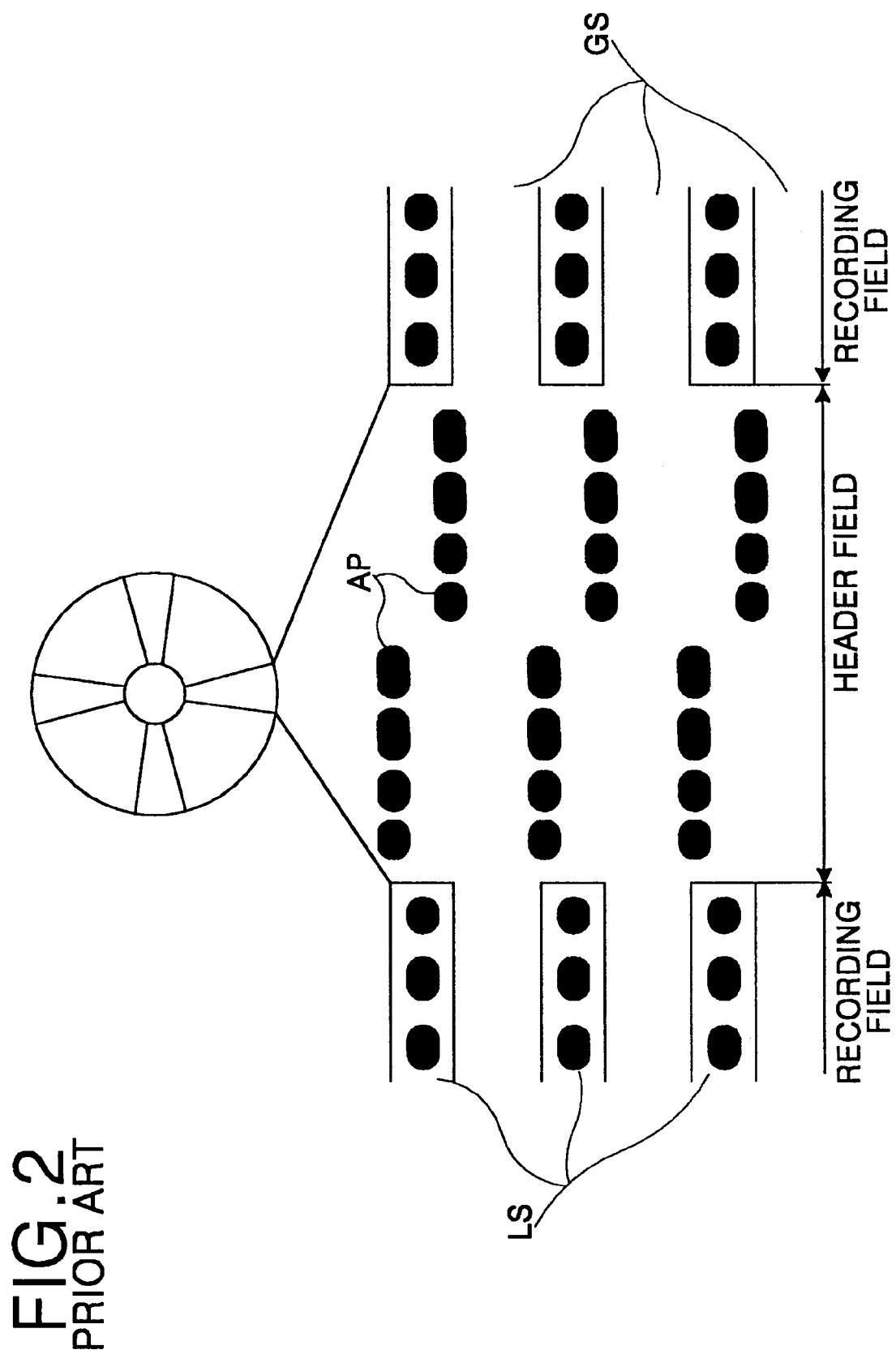
FIG. 2 is a schematic view showing the structure of a typical DVD-RAM.

Referring to FIG. 3, there is shown an eccentricity suppressing servo apparatus according to an embodiment of the present invention. The eccentricity suppressing servo apparatus includes a first adder 10, a gain controller 12, a second adder 14 and a planter 16 that are connected to make a loop. The first adder 10 receives a reference signal Ref from an input line 11 and a feedback signal Y(t) from a feedback line 13. Also, the first adder 10 adds the reference signal Ref to the feedback signal Y(t) to calculate a tracking correction amount. The gain controller 12 multiplies the tracking correction amount calculated with the first adder 10 by a predetermined value to generate a tracking control signal having an increasing gain in accordance with the tracking correction amount. In other words, the gain controller 12 responds to the tracking correction amount to increase a loop gain. Also, the gain controller 12 limits a gain of the tracking control signal in such a manner to excess a certain value, thereby stabilizing the feedback control. The tracking control signal generated at the gain controller 12 is applied, via the second adder 14, to the planter 16. Then, the planter 6 responds to the tracking control signal from the second adder 14 to move the position of a light beam in the width direction of signal track. Also, the planter 16 detects a tracking error signal TES from the distribution of a light beam reflected by the optical disc, and applies the detected tracking error signal TES, via the feedback line 13, to the first adder 10 as the feedback signal Y(t). In order to perform such a function, the planter 16 includes an optical pickup that has an actuator(not shown) for driving an objective lens and a photo detector(not shown) for detecting a reflective light from the optical disc, etc. The planter 16 includes a detection circuit for detecting the tracking error signal from a signal detected by means of the photo detector in addition to the optical pickup.

The eccentricity suppressing servo apparatus further includes a feed-forward controller 18 connected between the input line 11 and the second adder 14. The feed-forward controller 18 receives a primary tracking error signal PTES as shown in FIG. 4 in advance over the input line 11. This primary tracking error signal PTES is obtained by interrupting an operation of tracking servo and detecting a distribution of a light beam reflected from the optical disc to the photo detector in a state in which a light beam is moved by several signal tracks per once rotation of optical disc in the radial direction. Such a primary tracking error signal PTES are almost determined by an eccentricity amount of optical disc changing gradually in accordance with a phase of the optical disc. In other words, the primary tracking error signal PTES indicates eccentricity amounts of optical disc according to phases of the optical disc. The feed-forward controller 18 calculates an eccentricity amount with respect to each of areas on the optical disc, that is, sectors by the following formula making use of the primary tracking error signal PTES.

$$\text{Eccentricity amount} = (\text{track pitch} \times Pn)/4 \qquad (1)$$

wherein Pn is the number of signal tracks involved with a primary tracking error.

Figure 5:
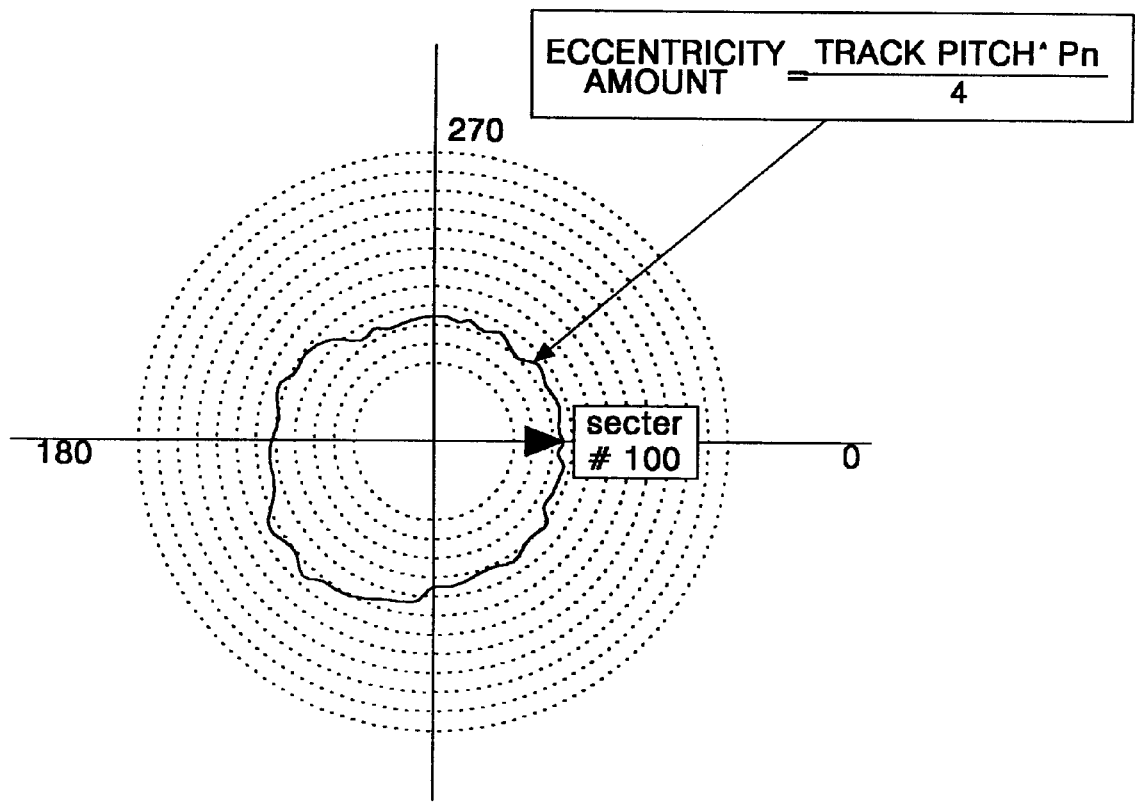
FIG. 5 shows a distribution of an eccentricity amount generated when a disc is driven.

Eccentricity amounts for each area calculated in this manner are distributed as shown in FIG. 5 and makes an eccentricity signal ECS having a waveform as shown in FIG. 4. Further, the feed-forward controller 18 produces an estimating correction signal based on the calculated eccentricity amount for each area and applies the estimating correction signal to the second adder 14. The estimating correction signal has polarity and an amplitude altered in accordance with a variation ratio in an eccentricity amount, that is, a difference in an eccentricity amount with respect to two adjacent positions on the circumference according to the rotation of optical disc. Such an estimating correction signal is added to the tracking error signal by means of the second adder 14 to thereby generate an improved tracking control signal ITAC as shown in FIG. 4. In FIG. 4, 'PTAC' is a tracking error signal generated by means of an eccentricity suppressing servo apparatus of existing feedback control system, and 'ITAC' is a tracking error signal generated by means of an eccentricity suppressing servo apparatus according to present invention. As indicated by these two tracking control signals PTAC and ITAC, the eccentricity suppressing servo apparatus according to the present invention responds quickly and accurately with respect to an eccentricity of disc. The tracking control signal ITAC generated at the second adder 14 is added to the estimating correction signal for suppressing an eccentricity amount estimated for each area(i.e., for each phase of optical disc), thereby detecting a normal tracking error signal NETS as shown in FIG. 4 from the planter 16. A tracking error component stemming from the eccentricity of optical disc is not included in the normal tracking error signal NETS. As a result, the feed-forward controller 10 is applied to a feedback control loop, so that it can increase only a loop gain without making an affect to a stable degree of the entire closed loop. Accordingly, the eccentricity suppressing servo apparatus is capable of correcting a tracking error quickly and accurately in an optical disc having a great eccentricity amount, too. Further, the eccentricity suppressing servo apparatus can suppress a great eccentricity amount powerfully.

Figure 6:
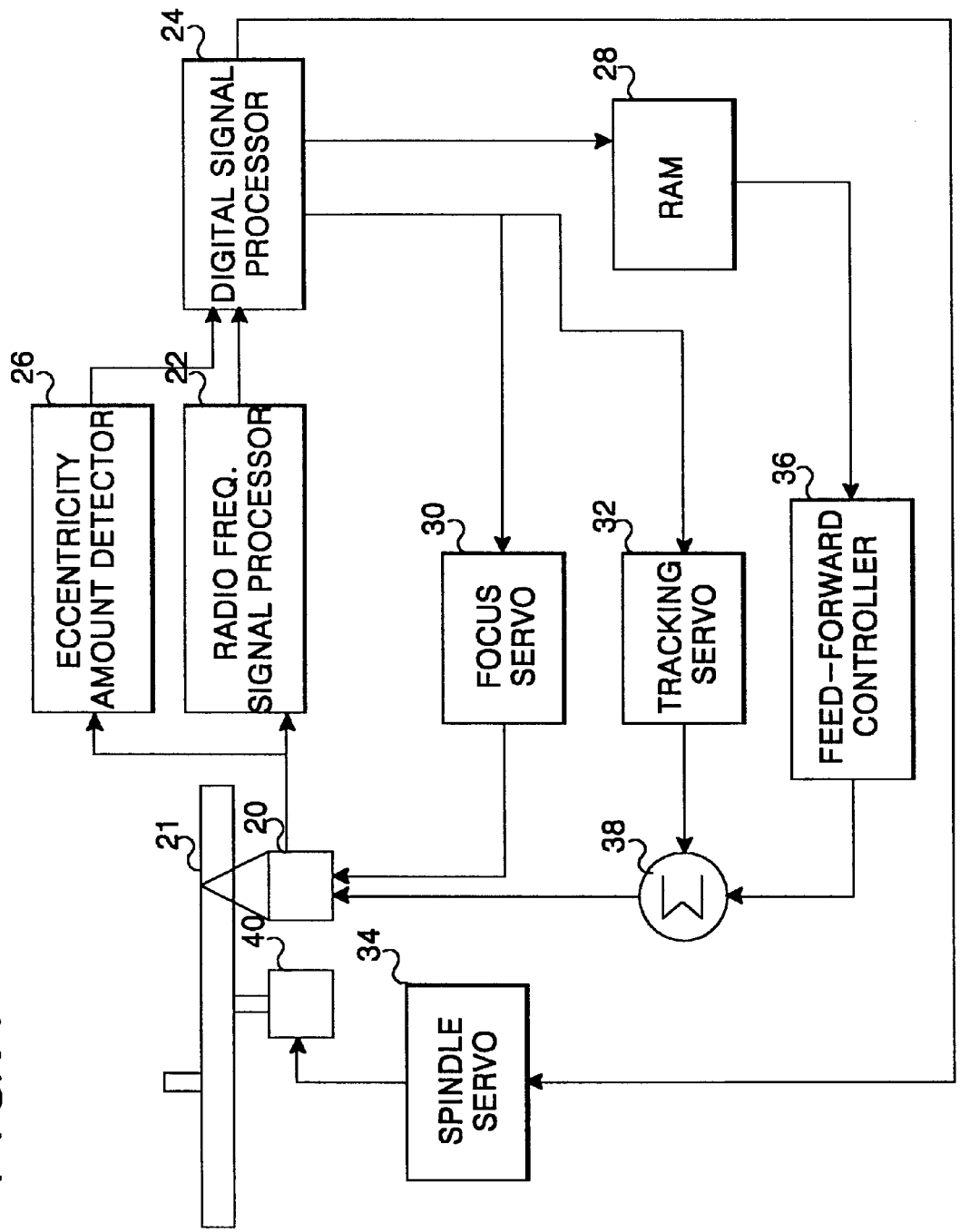
FIG. 6 is a schematic view of a disc driver employing an eccentricity suppressing servo apparatus according to an embodiment of the present invention.

Referring now to FIG. 6, there is shown a disc driver employing a disc driver employing an eccentricity suppressing servo apparatus according to the present invention. The disc driver includes an optical pickup 20 for picking up an information on an optical disc 21, a radio frequency signal processor 22 and a digital signal processor 24 connected, in cascade, to the optical pickup 20, and an eccentricity amount detector 26 connected between the optical pickup 20 and the digital signal processor 24. The optical pickup 20 irradiates a spot-shaped light beam onto signal tracks in the disc 21 and converts a light beam reflected by the signal track into an electrical signal. The radio frequency signal processor 22 detects a radio frequency signal from the electrical signal from the optical pickup 20 and applies the detected radio frequency signal to the digital signal processor 24. The eccentricity amount detector detects a primary tracking error signal PTES as shown in FIG. 4 from the electrical signal input from the optical pickup 20. The tracking error signal TES is a signal detected in a state in which a tracking servo operation is interrupted and the optical pickup 20 is moved by several signal tracks per once rotation of optical disc in the radial direction, and which includes a tracking amount according to a phase of the optical disc 21(i.e., an area of the optical disc 21). Such a primary tracking error signal PTES are almost determined by an eccentricity amount of optical disc changing gradually in accordance with a phase of the optical disc. In other words, the primary tracking error signal PTES indicates eccentricity amounts of optical disc according to phases of the optical disc. Also, the eccentricity amount detector 26 calculates an eccentricity amount with respect to each of areas on the optical disc, that is, sectors by the above-mentioned formula making use of the primary tracking error signal PTES. Eccentricity amounts for each area calculated in this manner are distributed as shown in FIG. 5 and makes an eccentricity signal ECS having a waveform as shown in FIG. 4. The digital signal processor 24 detects a tracking error signal, a rotation speed error signal and a focus error signal from a radio frequency signal from the radio frequency processor 22. Also, the digital signal processor 24 reproduces an information by demodulating and decoding a radio frequency signal. Further, the digital signal processor 24 calculates an estimating correction data for each area suitable for suppressing each of eccentricity amounts for each area from the eccentricity amount detector 26 and stores the calculated estimating correction data for each area into a RAM 28.

The disc driver further includes a focus servo 30, a tracking servo 32 and a spindle servo 34 connected commonly to the digital signal processor 24, and a feed-forward controller 36 connected to the RAM 28. The focus servo 30 allows a light beam to be irradiated onto the surface of the optical disc 21 in a spot shape by responding to a focus error signal from the digital signal processor 24 and controlling a current amount or voltage level of a focus control signal applied to a focus actuator(not shown) included in the optical pickup 20. The tracking servo 32 also responds to a tracking error signal NTES from the digital signal processor 24 to control a current amount or voltage level of the tracking control signal PTAC to be applied to a tracking actuator(not shown) included in the optical pickup 20 as shown in FIG. 4. The feed-forward controller 36 reads an estimating correction data according to an area on the optical disc 21 irradiated with a light beam from the RAM 28 to generate an estimating correction signal having a current amount or voltage level corresponding to a logical value of the read estimating correction data and applies the estimating correction signal to the adder 38. The estimating correction signal corrects a tracking error amount that can be generated by an eccentricity amount for each area on the optical disc 21 in advance. This estimating correction signal is added to a tracking actuator driving signal by means of the adder 38, thereby generating the improved tracking control signal ITAC as shown in FIG. 4. An estimated support gain for correcting a tracking error amount caused by an eccentricity for each area is added to the improved tracking control signal ITAC, thereby preventing it from being included in the tracking error signal caused by an eccentricity of optical disc 21. Accordingly, a tracking error signal NTAC generated at the digital signal processor 24 has a waveform as shown in FIG. 4. As a result, the feed-forward controller 36 allows a tracking error amount caused by an eccentricity of the optical disc 21 to be corrected in advance to thereby correct a tracking error caused by a great eccentricity amount quickly and accurately. As a result, the optical disc driver employing the eccentricity suppressing servo apparatus according to the present invention is capable of suppressing a great eccentricity amount powerfully. In addition, a light beam is traced accurately along the center line in the optical disc 21. The spindle servo 34 responds to a rotation speed error signal from the digital signal processor 24 to control a current amount or voltage level of a motor driving signal to applied to the spindle motor 40, thereby maintaining a rotation speed of optical disc or a playing speed of the signal track on the optical disc 21.

Figure 7:
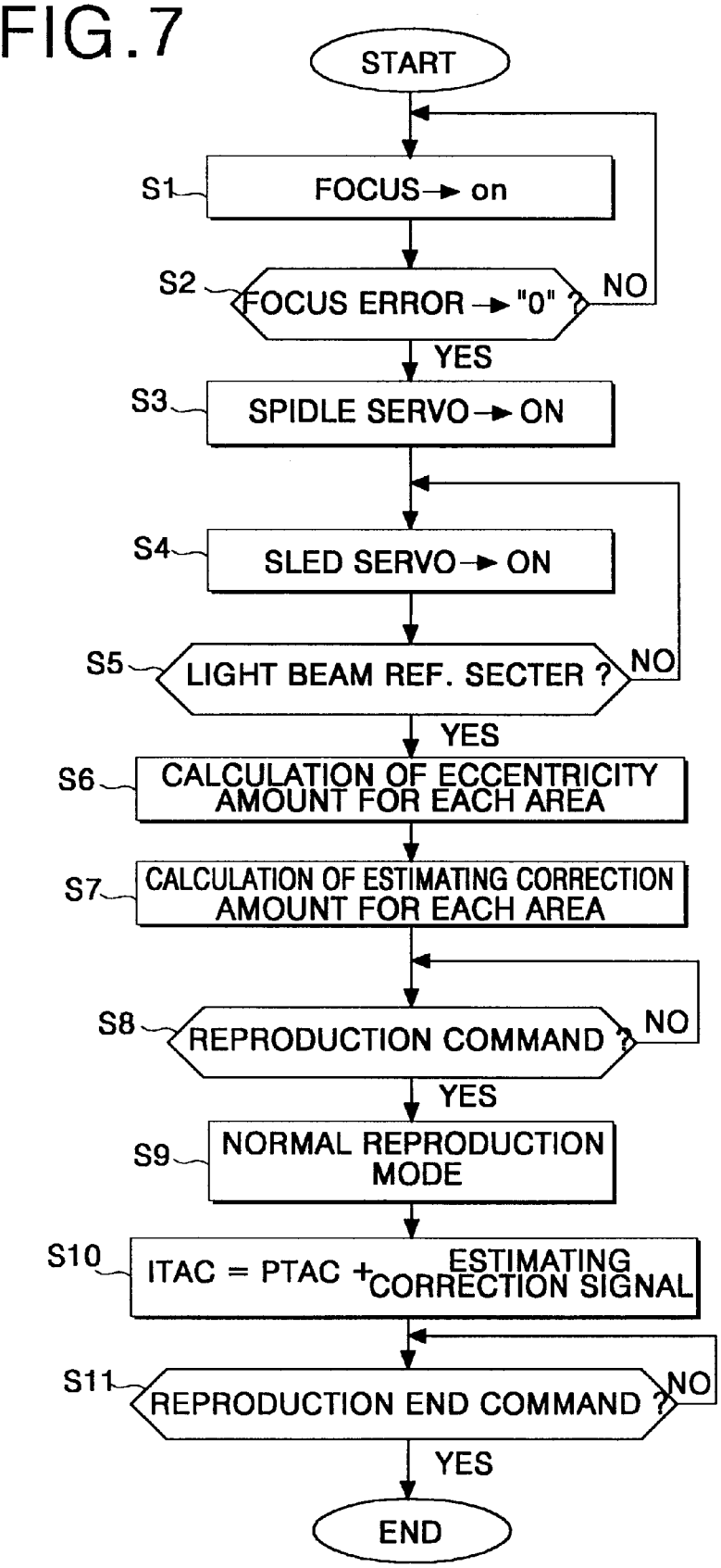
FIG. 7 is a flow chart of a disc reproducing process applying an eccentricity suppressing servo method according to an embodiment of the present invention.

FIG. 7 is a flow chart for explaining an optical disc reproducing process employing an eccentricity suppressing servo method according to an embodiment of the present invention step by step. This optical disc reproducing method is performed by means of the disc driver in FIG. 6. In FIG. 7, step S1 is performed after the optical disc 21 was loaded onto the spindle motor 40 and the optical disc driver was initialized. In step S1, the focus servo 30 is driven. A focus of a light beam irradiated from the optical pickup 20 onto the optical disc 21 is controlled by means of the focus servo 30. Further, in step S2, the digital signal processor 24 checks whether or not a focus error signal is detected from a radio frequency signal from the radio signal processor 22. At this time, if a focus error signal is detected, then the digital signal processor 24 applies the focus error signal to the focus servo 30.

In step S3, if a focus error signal is not detected in step S2, then the spindle servo 34 is driven. By the spindle servo 34, a rotation speed of the optical disc 21 or a playing speed of the signal track on the optical disc 21 is maintained constantly. Subsequently, in step S4, a sled servo(not shown) is driven. The sled servo allows a light beam to be progressed traversing a certain number of signal tracks during once rotation of the optical disc 21. In step S5, the eccentricity amount detector 26 detects a primary tracking error signal PTES changing in accordance with a phase of the optical disc 21 from an electrical signal from the optical pickup 20(i.e., in accordance with an area on the optical disc 21). The primary tracking error signal PTES detected by means of the eccentricity amount detector 26 is changed in accordance with an eccentricity amount according to a phase of the optical disc 21 because the tracking servo 32 is not being currently driven. Meanwhile, the digital signal processor 24 reproduces an information by demodulating and decoding a radio frequency signal from the radio frequency signal processor 22 and determines whether or not a light beam arrived at a reference area(i.e., a reference sector) based on the reproduced information. In other words, the digital signal processor 24 determines whether or not a light beam moved traversing a certain number of signal tracks.

In step S6, if a light beam moved traversing a certain number of signal tracks in step S5, then the eccentricity amount detector 26 calculates an eccentricity amount for each sector according to a phase of the optical disc 21 making use of the above-mentioned formula (1) based on the primary tracking error signal PTES. Then, in step S7, the digital signal processor 24 calculates a feed-forward correction value suitable for suppressing eccentricity amounts for each area calculated by the eccentricity amount detector 26 and stores the calculated feed-forward correction values into the RAM 28 as an estimating correction data for each area.

Next, in step S8, the optical disc driver waits until a reproduction command is input from a user. In other words, the optical disc driver waits until 'play key' is selected.

In step S9, if a reproduction command is input in step S8, then the optical disc driver enters a normal reproduction mode. Subsequently, in step S10, the adder 38 adds the estimating correction signal from the feed-forward controller 36 to the tracking control signal PTAC from the tracking servo 32 to generate an improved tracking control signal ITAC. By this improved tracking control signal ITAC, the position of a light beam in the width direction of the signal track is controlled. The estimating correction signal is a signal generated by the feed-forward controller 36 reading sequentially the estimating correction data for each area stored in the RAM 28, and which has a current amount or voltage level changing in accordance with a logical value of the read estimating correction data. Such a step S10 is continued until a reproduction end command is input. In step S11, the optical disc driver checks if a reproduction end command(i.e., 'stop key') is input. If the reproduction end command is input, the optical disc driver enters from the normal mode into the waiting mode.

In the reproducing method as described above, eccentricity amounts according to a phase(i.e., area) of the optical disc is calculated in advance and an estimating correction data for each area capable of suppressing each of the eccentricity amounts is provided. The estimating correction data for each area prevents a generation of a tracking error component caused by the eccentricity amount. In other words, an eccentricity of disc is suppressed by the estimating correction data for each area. According to the reproducing method, a tracking control can be not only performed accurately in an optical disc having a great eccentricity, but also an information recorded on the optical disc can be reproduced accurately. Furthermore, a tracking control can be not only performed accurately in an optical disc having a very short distance between the tracks including a DVD-RAM different in the structure of header fields and recording fields, but also an information recorded on such an optical disc can be reproduced accurately.

As described above, in the eccentricity suppressing servo apparatus and method, eccentricity amounts according to a phase(i.e., an area) of the optical disc in advance and an estimating correction data for each area capable of suppressing each of the eccentricity amounts is provided. The estimating correction data for each area prevents a generation of a tracking error component caused by the eccentricity amount. In other words, by the estimating correction data for each area, an eccentricity of the optical disc is not only suppressed quickly, but also a great optical disc eccentricity amount is effectively suppressed without making an affect to a stable degree of a control system. Accordingly, the optical disc driver and the reproducing method employing the above eccentricity suppressing servo allows a tracking control to be performed accurately in an optical disc having a great eccentricity amount and, at the same time, allows an information recorded on such an optical disc to be reproduced accurately.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. For example, it should be understood from the reproducing optical disc driver and the optical disc reproducing method employing an eccentricity suppressing servo according to the present invention that the eccentricity suppressing servo according to the present invention is applicable to the recording optical disc driver and the optical disc recording method. Accordingly, the scope of the invention shall be determined only by the appended claims and their equivalents.

What is claimed is:

1. A eccentricity suppressing method, comprising the steps of:

detecting eccentricity amounts according to a phase of an optical disc;

providing estimating correction amounts for each phase suitable for suppressing each of the eccentricity amounts; and responding to a tracking error and the estimating correction amounts for each phase to control a tracking of light beam.

2. The eccentricity suppressing method as claimed in claim 1, wherein said step of detecting the eccentricity amounts includes:

performing once rotation of the optical disc and allowing a light beam to progress traversing a certain number of signal tracks;

detecting a tracking error amount for each phase of the optical disc; and calculating the eccentricity amounts for each phase based on the tracking error amount for each phase.

3. The eccentricity suppressing method as claimed in claim 2, wherein said step of detecting the eccentricity amounts provides the eccentricity amounts based on the following formula:

$$\text{eccentricity amount} = (\text{track pitch} \times \text{the number of tracks involved with the tracking error})/4.$$

4. The eccentricity suppressing method as claimed in claim 1, wherein said step of performing the tracking control includes:

adding a reference amount to the tracking error amount to calculate an error correction amount;

generating a tracking control signal having a gain depending upon the error correction amount;

generating an estimating correction signal having a gain changing in accordance with the estimating correction amount for each phase;

adding the estimating correction signal to the tracking control signal to generate a compensated tracking control signal; and controlling the position of the light beam using the compensated tracking control signal.

5. A eccentricity suppressing apparatus, comprising:

eccentricity detecting means for detecting eccentricity amounts according to a phase of an optical disc;

suppression amount calculating means for providing estimating correction amounts for each phase suitable for suppressing each of the eccentricity amounts; and tracking control means for responding to a tracking error and the estimating correction amounts for each phase to control a tracking of light beam.

6. The eccentricity suppressing apparatus as claimed in claim 5, wherein said eccentricity detecting means includes:

a sled servo for allowing a light beam to progress traversing a certain number of signal tracks during once rotation of the optical disc;

tracking error detecting means for detecting a tracking error amount for each phase of the optical disc; and operation means for calculating the eccentricity amounts for each phase based on the tracking error amount for each phase.

7. The eccentricity suppressing apparatus as claimed in claim 6, wherein said operation means provides the eccentricity amounts based on the following formula:

eccentricity amount=(track pitch×the number of tracks involved with the tracking error)/4.

8. The eccentricity suppressing apparatus as claimed in claim 5, wherein said tracking control means includes:

a first adder for adding a reference amount to the tracking error amount to calculate an error correction amount;

a gain controller for generating a tracking control signal having a gain depending upon the error correction amount;

a feed-forward controller for generating an estimating correction signal having a gain changing in accordance with the estimating correction amount for each phase;

a second adder for adding the estimating correction signal to the tracking control signal to generate a compensated tracking control signal; and a tracking actuator for controlling the position of the light beam using the compensated tracking control signal.

9. An optical disc recording/reproducing servo method, comprising the steps of:

detecting eccentricity amounts according to a phase of an optical disc;

providing estimating correction amounts for each phase suitable for suppressing each of the eccentricity amounts;

responding to a tracking error and the estimating correction amounts for each phase to control a tracking of light beam; and performing a recording and reproduction of an information for the optical disc.

10. An optical disc driver, comprising:

eccentricity detecting means for detecting eccentricity amounts according to a phase of an optical disc;

suppression amount calculating means for providing estimating correction amounts for each phase suitable for suppressing each of the eccentricity amounts;

tracking control means for responding to a tracking error and the estimating correction amounts for each phase to control a tracking of light beam; and recording/reproducing means for performing a recording and reproduction of an information for the optical disc.

* * * * *